J. LACEY & G. B. CORNELL.

Improvement in Wrenches for Extracting Bung-Bushes.

No. 5,026.

Reissued Aug. 6, 1872.

Witnesses
N. H. Sherburne
J. W. Merriam

Inventor
George B. Cornell
by Sherburne & Co
Attorneys

AM. PHOTO-LITHOGRAPHIC CO. N.Y. (OSBORNE'S PROCESS.)

UNITED STATES PATENT OFFICE.

JOHN LACEY AND GEORGE B. CORNELL, OF CHICAGO, ILLINOIS; SAID LACEY ASSIGNOR TO G. B. CORNELL.

IMPROVEMENT IN WRENCHES FOR EXTRACTING BUNG-BUSHES.

Specification forming part of Letters Patent No. 118,617, dated August 29, 1871; reissue No. 5,026, dated August 6, 1872.

DIVISION A.

*To all whom it may concern:*

Be it known that we, JOHN LACEY and GEORGE B. CORNELL, of Chicago, in the county of Cook and State of Illinois, have invented an Improved Wrench for Securing Metallic Bushing in Casks or Barrels; and we do hereby declare the following to be a full, clear, and exact description thereof, which will enable others skilled in the art to which our invention appertains to make and use the same, reference being had to the accompanying drawing forming part of this specification, in which—

Figure 1:
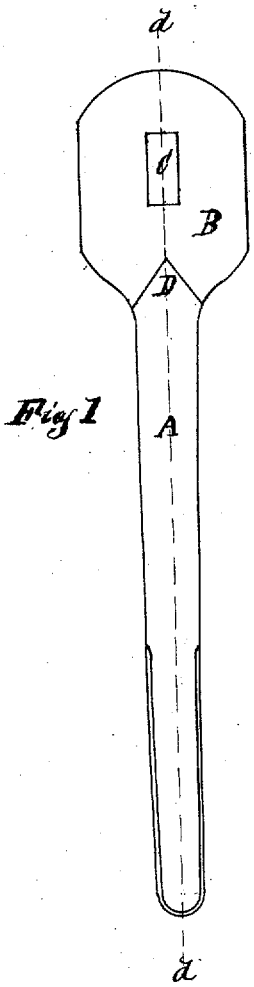
Figure 2:
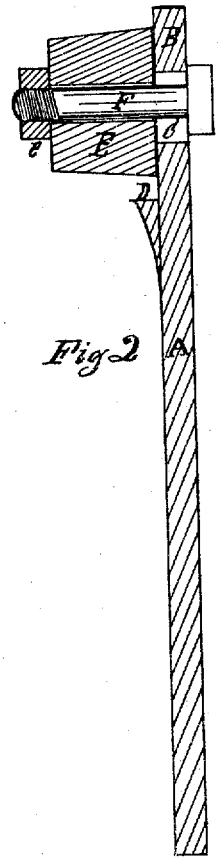

Figure 1 is a bottom view of a wrench embodying the said improvement, and Fig. 2 is a longitudinal central section of the same taken on the line *d d* drawn through Fig. 1.

Similar letters of reference indicate like parts in both figures of the drawing.

The present invention relates to a wrench employed in securing a metallic bung-bushing within the aperture of casks, barrels, &c.; and the improvement consists in providing the shank of the wrench with a cylindrical core so arranged as to closely fit the aperture in the bushing, and a V-shaped projection adapted to fit a corresponding notch formed in the bushing, whereby the same may be turned into place without assuming an oblique position within the bung-opening, and also preventing the wrench from slipping from its seat; all of which will be more fully understood by the following description.

In the drawing, A represents the shank of the wrench, which consists of a plain metal bar of the requisite length. Attached to one end of this bar is a flat metal plate, B, which is provided at its center with an elongated mortise, C, as shown in Fig. 1. This shank is so formed, at its junction with the plate, as to provide a V-shaped projection, D, the point of which extends forward toward the center of the plate. E represents a cylindrical cast-metal core, which is made tapering, and so arranged as to fit the aperture in the bushing. This core is made separate from the plate, and is attached thereto by means of a bolt, F, which passes through the mortise formed in the plate, as shown in Fig. 2. The arrangement of this core is such as to admit of being removed from the bolt by removing the nut *e*, the object of which is to allow a core of greater diameter to be substituted when used in bushings of large size, provision being made for the elongation of the mortise in the plate for the moving of the bolt toward or from the projection D, which becomes necessary when cores of different sizes are used.

In using the said invention the core is inserted into the opening through the bushing, and turned until projection D falls into a notch formed in the bushing, which is adapted to fit the same; and by means of the core the bushing is kept steady, and prevented from assuming an oblique position in the bung-opening while being turned into place, and by the contact of the projection within the notch the wrench is prevented from slipping from its seat, thereby enabling the bushing to be readily turned into place.

We do not wish to confine ourselves exclusively to the V-shaped projection, as any form that will prevent the core from turning independent of the bushing will produce the same result.

Having thus described the said invention, we claim—

The wrench herein described, consisting of a shank, A, plate B, projection D, and core E, the said core adapted to fit the opening through the bushing, whereby the same is prevented from assuming an oblique position when being turned into place, substantially as described.

JOHN LACEY.
GEO. B. CORNELL.

Witnesses:
WILLIAM EDGAR,
J. W. MERRIAM.